June 17, 1958  W. J. REDMAN ET AL  2,838,958
DRIVE FOR RECIPROCATING MEMBER
Filed May 3, 1954  4 Sheets-Sheet 1
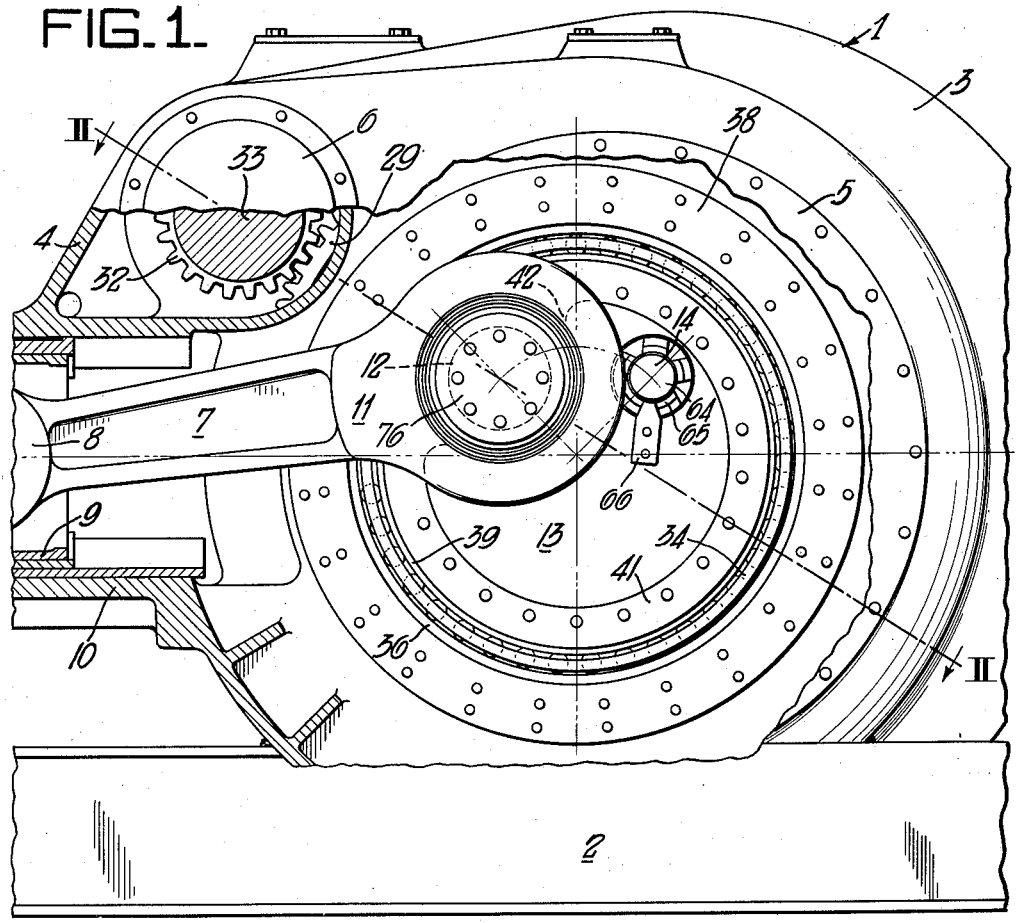
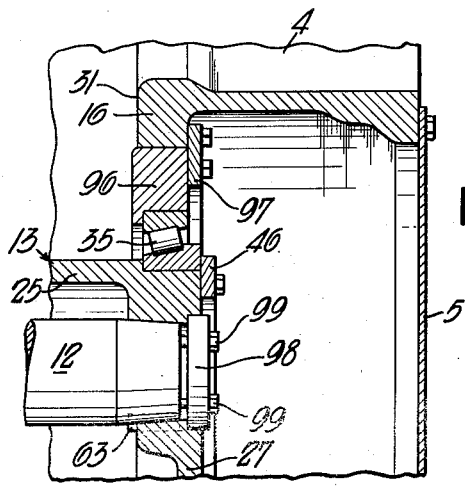
Inventors:
WILLIAM J. REDMAN and
JOHN S. FULLER,
by: Donald G. Dalton
their Attorney.

June 17, 1958 W. J. REDMAN ET AL 2,838,958
DRIVE FOR RECIPROCATING MEMBER
Filed May 3, 1954 4 Sheets-Sheet 2
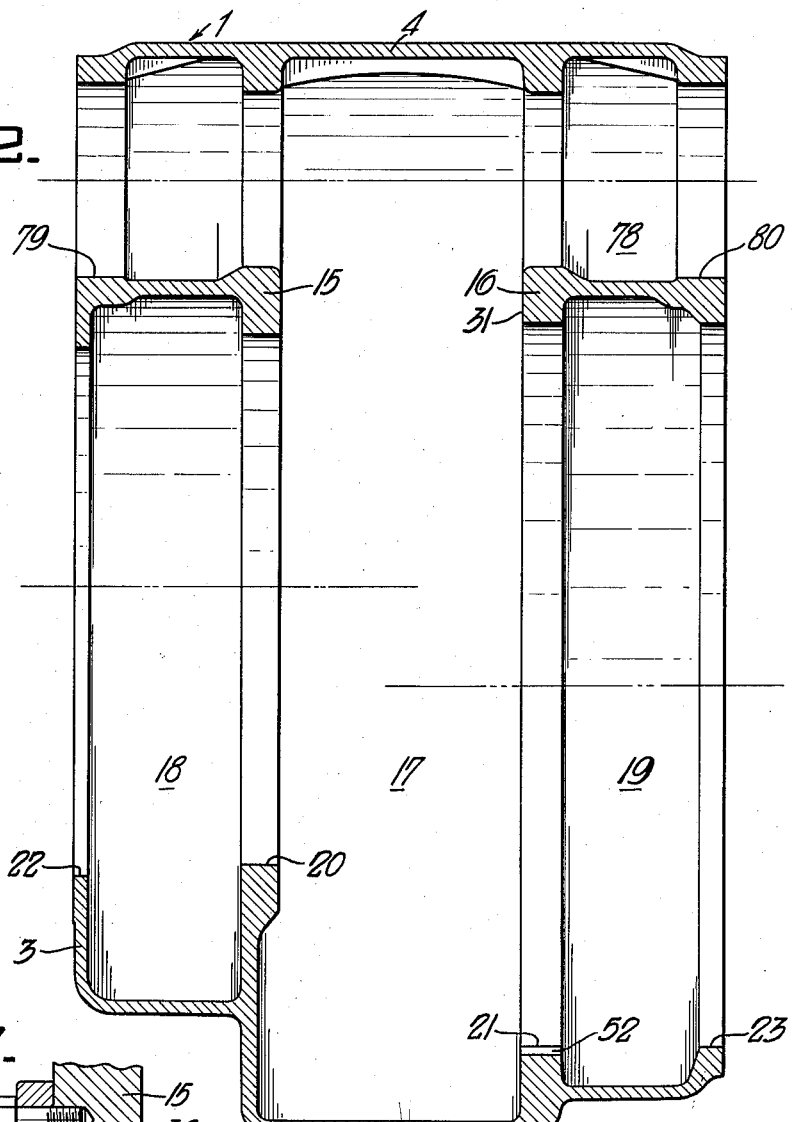
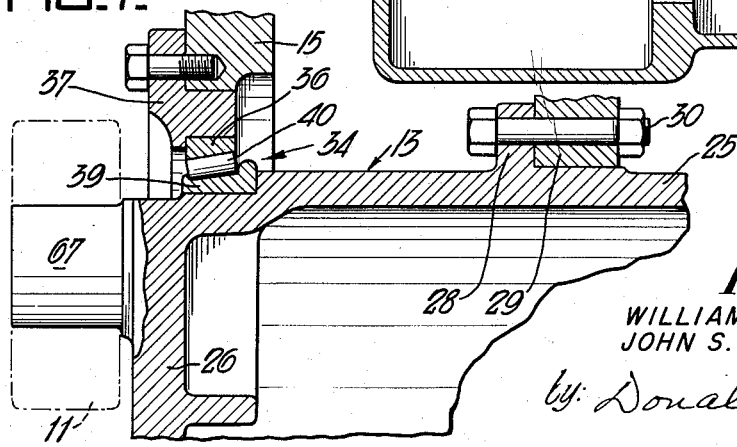
Inventors:
WILLIAM J. REDMAN and
JOHN S. FULLER,
by: Donald G. Dalton
their Attorney.

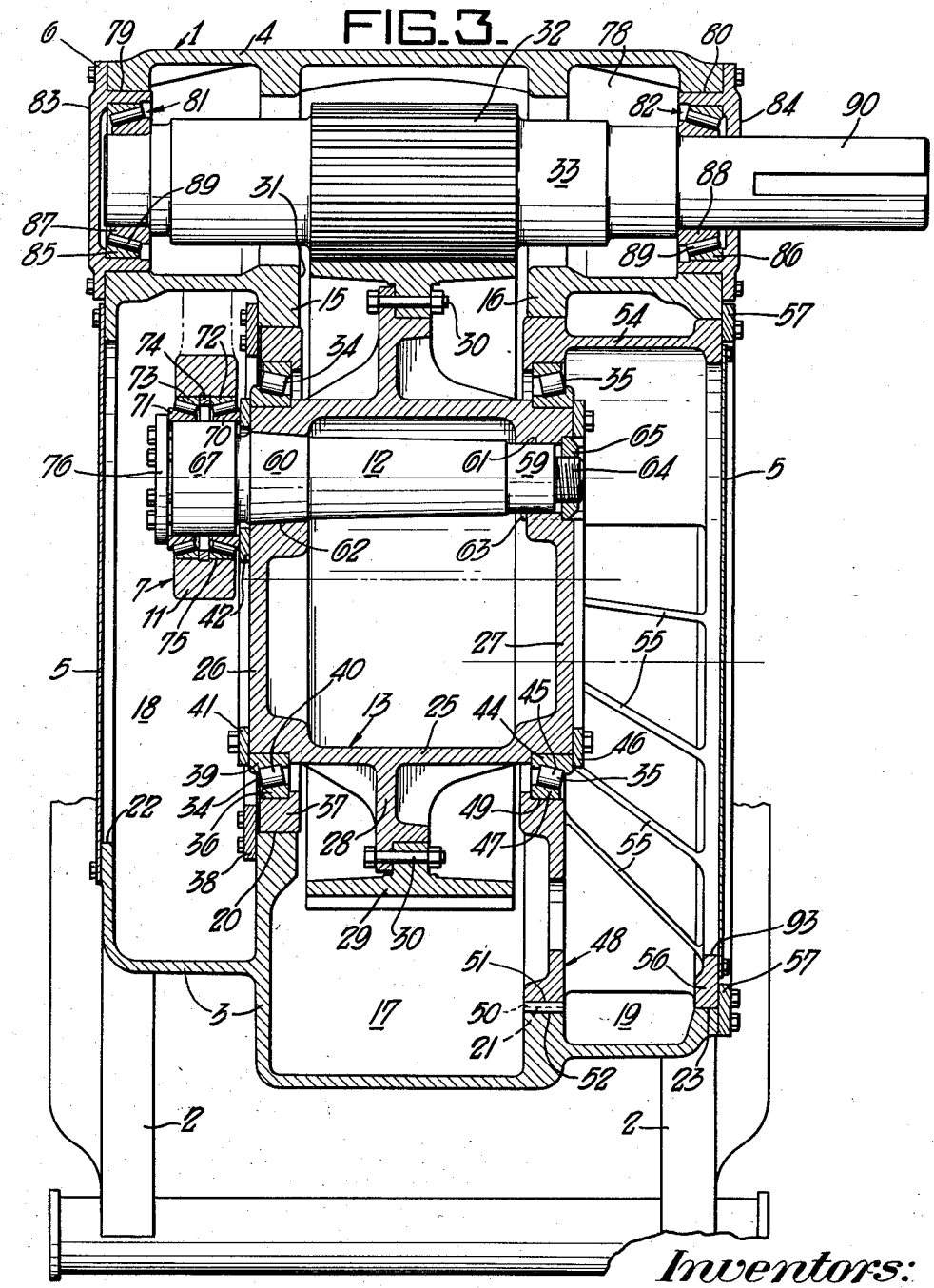
Inventors:
WILLIAM J. REDMAN and
JOHN S. FULLER,
by Donald G. Dalton
their Attorney June 17, 1958   W. J. REDMAN ET AL   2,838,958
DRIVE FOR RECIPROCATING MEMBER
Filed May 3, 1954   4 Sheets-Sheet 4
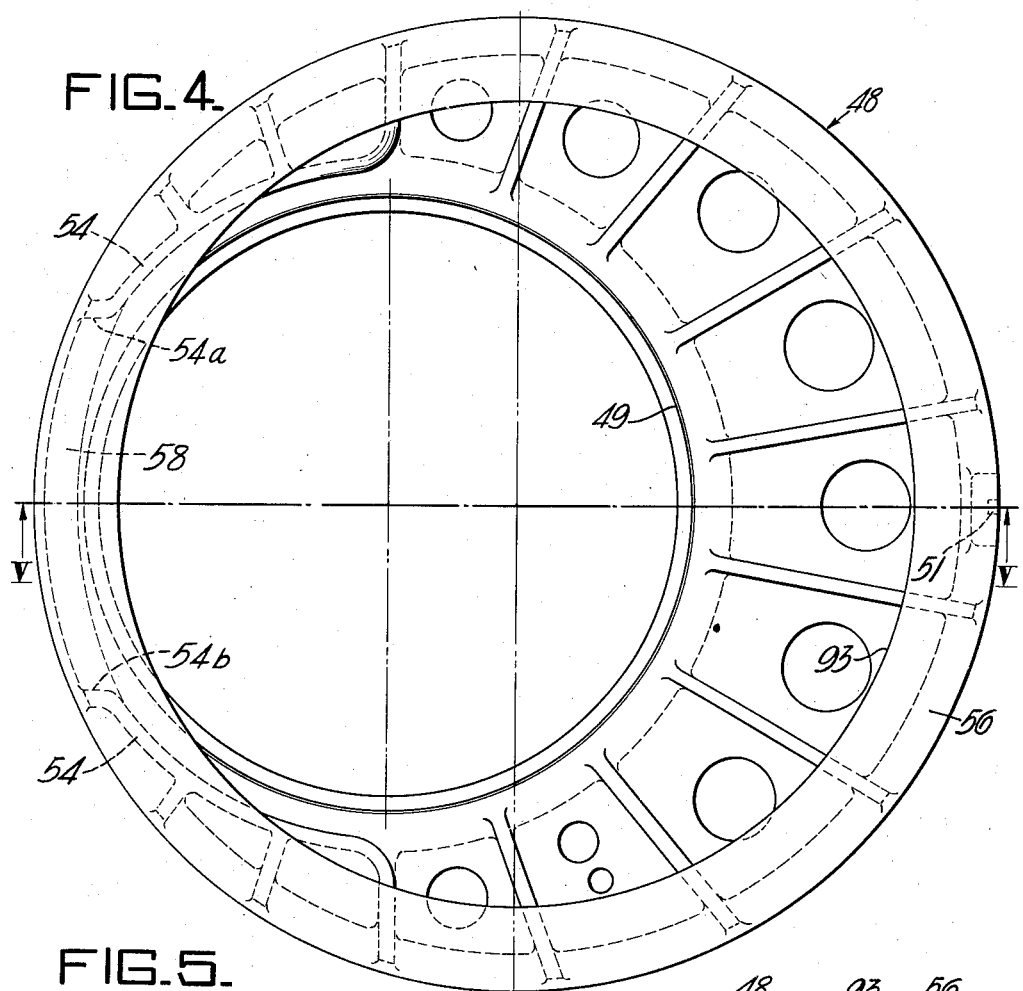
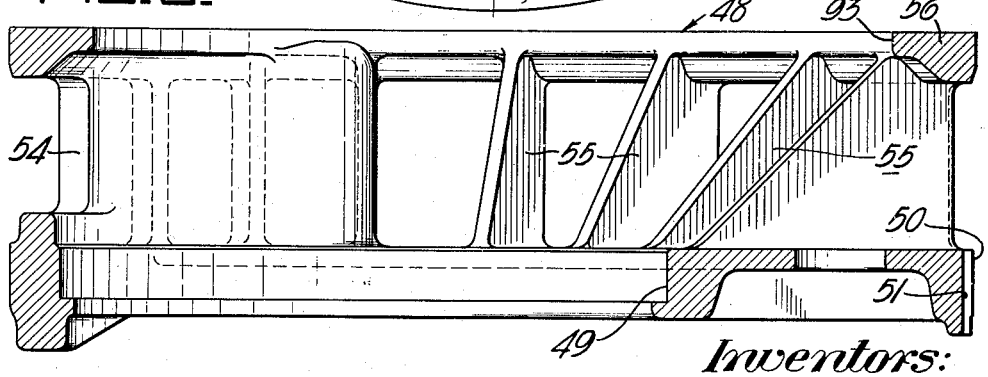
Inventors:
WILLIAM J. REDMAN and
JOHN S. FULLER,
by: Donald G. Dalton
their Attorney.

2,838,958

DRIVE FOR RECIPROCATING MEMBER

William J. Redman, Pittsburgh, Pa., and John S. Fuller, Dallas, Tex., assignors to United States Steel Corporation, a corporation of New Jersey Application May 3, 1954, Serial No. 427,190

12 Claims. (Cl. 74—606)

This invention relates to an improved mechanical drive for a pitman or other reciprocating mechanism, of the type, for example, used to actuate industrial pumps, particularly, slush pumps used in the drilling of oil wells.

More specifically, this invention relates to an improved pitman drive of the type shown in United States Patents Nos. 1,862,807 and 2,133,048, issued respectively June 14, 1932, and October 11, 1938, to John M. Shimer. In these patents, a pitman is shown connected to a crank pin on the outer end of a crank arm which has its inner end connected to a crank shaft. Inwardly of the connection of the crank arm to the crank shaft, the crank shaft is supported by a pair of axially spaced bearings between which a drive gear is mounted, a drive pinion having meshing engagement with the drive gear for the crank shaft. To accommodate increased horsepower requirements of modern equipment, the size of drives of this character must be increased and the resulting increase in weight present difficulties from the standpoint of transportation of the equipment from the manufacturer to the user, the weight of the equipment being an important factor in interstate commerce. In addition, the increased size of the equipment results in a greater overhang of the crank arm on the crank shaft thus requiring a larger housing to provide space for the crank arm. The greater overhang of the crank arm further introduces operational problems from the standpoint of vibration of the drive when operating under heavy loads.

One of the principal objects of this invention is to provide an improved drive of the character referred to which is more compact, which is of less weight and more easily transported, and which reduces vibration to a minimum by providing a more rigid mounting for its operating parts. To this end, and in a manner to be described, the improved drive of this invention eliminates the crank arm and crank shaft of drives such as shown in the patents referred to. This is accomplished by providing a hub mounting for the drive gear which has bearing supports directly on the drive housing adjacent its periphery, a drive pin for actuating the pitman being secured directly to the hub and being rotated thereby along a circular path concentric to and within the bearing supports. The elimination of the crank arm and crank shaft reduces the space required for the pitman actuating parts and thereby reduces the size of the housing required. In addition, there is provided a more compact and rigid construction which is less subject to vibration under heavy load.

A further object is to provide a pitman drive of the character referred to with provisions for assembling all of its operating parts by lateral movement of the operating parts through openings in the sides of the drive housing. This feature of the invention enables the use of a housing which is free of openings in its periphery such as are provided in the patented drives referred to for assembling the drive gear in an operating position and thus provides a housing of greater strength and more rigid construction. In addition, assembly of the driving parts within the housing and their replacement or repair in the field is more readily accomplished.

Other objects and advantages of the invention will be apparent from the following description.

In the drawings, there is shown a preferred embodiment of the invention. In this showing:

Figure 1 is a side elevational view of a pitman drive constructed in accordance with the princples of this invention, parts thereof being broken away and shown in section to illustrate the arrangement of the operating parts of the drive within the housing;

Figure 2 is a sectional view of the housing for the drive taken substantially along the line II—II of Figure 1;

Figure 3 is a sectional view similar to Figure 2 showing the operating parts assembled in position within the housing;

Figure 4 is an end elevational view of a removable bearing support used in the assembly shown in Figure 3;

Figure 5 is a sectional view taken substantially along the line V—V of Figure 4;

Figure 6 is a fragmentary sectional view in the plane of Figure 3 illustrating a modified hub and drive pin mounting; and Figure 7 is a fragmentary sectional view illustrating a modified form of gear hub and drive pin.

Referring to Figure 1 of the drawings, the numeral 1 designates a drive housing which is mounted on supporting skids 2. The housing is comprised of a main portion 3 in which a drive gear for a pitman is mounted and a smaller and integral portion 4 in which a drive pinion is mounted. Each of the portions 3 and 4 have axially extending openings through which the operating parts of the drive may be moved to a position for assembly in the housing in a manner to be described. Cover plates 5 and 6 respectively close the ends of the axially extending openings in the housing portions 3 and 4.

A pitman 7 has a connection (not shown) at its outer end 8 with a slide 9 which is mounted for reciprocation in an extension 10 of the housing 1. While the slide 9 is intended for connection with a slush pump as shown in the above mentioned Patent No. 2,133,048, it will be understood that its use is not so limited but may be used for accommodating any other type of mechanism requiring a reciprocating drive. The inner end 11 of the pitman has an operating connection with a drive pin 12 which is mounted in and rotated by a hub 13 in a manner to be described. Preferably, the hub 13 mounts two drive pins 12 and 14 which are radially displaced with respect to each other by an angle of 90°, the second pin 14 having an operating connection with a pitman (not shown) on the other end of the hub 13 as viewed in Figure 1 for actuating a second slush pump or other mechanism to be reciprocated.

As shown in Figure 2, the main housing portion 3 has a pair of axially spaced partition walls 15 and 16 which divide the space therein into a centrally located gear drive compartment 17 and end compartments 18 and 19. The partition walls 15 and 16 have openings 20 and 21 in which bearing supports for the hub 13 are mounted in a manner to be described. The end compartments 18 and 19 provide space which accommodates the movement of the pitmans connected with the crank pins 12 and 14. The ends of the housing portion 3 have openings 22 and 23 which afford access respectively to the compartments 18 and 19. The opening 21 in the partition wall 16 and the opening 23 in one end of the housing are larger and eccentric with respect to the similar openings 20 and 22 at the other end of the housing to provide for assembly of the hub 13 in the compartment 17 in a manner to be described.

As best shown in Figure 3, the hub 13 is a hollow casting comprising a cylinder 25 having end walls 26 and 27. The cylinder 25 has a centrally located and outwardly projecting flange 28 to which a drive gear 29 is secured by bolts 30. An opening 31 provides a communication between the interiors of the housing portions 3 and 4, and the drive gear 29 projects through this opening and has meshing engagement with a pinion 32 mounted on a drive shaft 33.

The hub 13 is rotatably supported in the partition walls 15 and 16 by axially spaced bearing assemblies 34 and 35. The bearing assembly 34 comprises an outer race 36 which is received in a mounting ring 37 which is in turn mounted in to the opening 20 in the partition wall 15, a retaining ring 38 being bolted to the partition wall 15 and to the mounting ring 37 for holding the mounting ring 37 in position. The inner race 39 of the assembly 34 has roller bearings 40 permanently assembled thereon and is mounted on the hub 13 along the outer edge of the end wall 26, a retaining ring 41 being bolted to the end wall 26 for holding the inner race 39 in position. The retaining ring 41 has an inwardly projecting circular portion 42 adjacent and surrounding the crank pin projecting therethrough which provides a backing plate for the pitman bearings in a manner to be described.

The bearing assembly 35 comprises an inner race 44 having roller bearings 45 permanently assembled thereon, the race 44 being mounted on the hub 13 adjacent the outer edge of its end wall 27 and being held in place by a retaining ring 46 bolted to the end wall 27. Its outer race 47 is mounted in a ring 48 received in the opening 21 in the partition wall 16. The openings in the rings 37 and 48 mounting the outer races 36 and 47 of the bearing assemblies 34 and 35 are concentric. However, it will be recalled that the openings 21 and 23 are larger than the similar openings 20 and 22 at the other end of the housing to allow for assembly of the hub 13 and gear 29 thereon, and this requires a specially constructed mounting ring 48.

The structure of the mounting ring 48 is specifically illustrated in Figures 4 and 5. As shown in these figures, its inner periphery 49 in which the outer bearing race 47 is received is eccentric with respect to its outer periphery 50 which is received in the larger opening 21 in the partition wall 16. Since the bearing race receiving opening defined by its inner periphery 49 must be concentric with the similar opening in the mounting ring 37 at the other end of the hub, the ring 48 must be accurately mounted in the opening 21 in the partition wall 16. To insure accuracy of the mounting of the ring 48 in this respect, its periphery is provided with a keyway 51 which cooperates with a keyway 52 (see Figure 2) at the bottom of the opening 21 in the end wall 16. A key (not shown) is received in the cooperating keyways 51 and 52 to secure the ring 48 in its properly centered position with its bearing race receiving opening defined by its inner periphery 49 concentric with the bearing assemblies 34 and 35. The ring 48 has an outwardly projecting flange 54 provided with reinforcing ribs 55 and a mounting ring 56 at its outer edge. The mounting ring 56 is received and has a snug fit in the housing opening 23, and a retaining ring 57 (see Figure 3) is bolted to the housing portion 3 and to mounting ring 56 to secure the ring 48 against axial movement out of the enlarged openings 21 and 23. The flange 54 is interrupted between the circumferentially spaced points 54a and 54b as viewed in Figure 4 to provide an opening through which an operating pitman extends.

Each pin 12 and 14 has a similar mounting in the hub 13 although the mounting parts thereof are reversed as will be apparent from Figure 1. As shown in connection with the pin 12 in Figure 3, each pin has end portions 59 and 60 which are received respectively in openings 61 and 62 in the hub end walls 27 and 26. The opening 62 and pin end 60 are tapered to limit movement of the pin 12 to the right as viewed in Figure 3. The opening 62 is larger than the opening 61 to facilitate assembly of the drive pin 12 in the hub by movement through the openings 62 and 61 from the right as viewed in Figure 3. A key 63 secures the pin 12 against rotation with respect to the hub. The pin end 59 has a threaded projection 64 for engagement with a holding nut 65, a locking lug 66 (see Figure 1) being engaged in recesses in the outer periphery of the locking nut 65 to prevent loosening movement thereof. The end 60 of the pin 12 has a pitman actuating part 67 which projects into the housing compartment 18.

The drive pin 14 has a mounting which is identical to that of the pin 12 except that the positions of the parts are reversed so that the pitman actuating projection 67 on the pin 14 projects into the other housing compartment 19.

The inner end portion 11 of the pitman is connected with the drive pin actuating projection 67 by a pair of bearing assemblies comprising a pair of axially spaced inner races 70 and 71 each of which has roller bearings permanently assembled thereon. The outer races 72 and 73 having a separator ring 74 therebetween are permanently mounted in an opening 75 centrally of the pitman end 11. To connect the pitman to the actuating projection 67, the inner race 70 is first moved over the actuating projection 67 to a position in which it abuts against the backing plate 42 on the retaining ring 41 as described above. The pitman with the outer races 72 and 73 in position thereon is then moved to the position shown in Figure 3 in which the outer race 72 is engaged with the roller bearings on the inner race 70. Thereafter, the inner race 71 with rollers thereon is assembled in the position shown in Figure 3 with its roller bearings engaged with the outer race 73. The assembly is completed by bolting a retaining plate 76 to the outer end of the actuating projection 67. The retaining plate 76 bears against the inner race 71 and moves it axially inwardly to a position in which its rollers have proper bearing engagement with the outer race 73. It will be noted that the races 70 and 71, as well as the outer races 72 and 73 have opposite tapers so that tightening of the plate 76 is effective to position the pitman end 11 axially with respect to the actuating projection 67 and thereby obtain proper bearing engagement of both sets of tapered bearing assemblies.

As indicated above, the pinion mounting portion 4 of the housing has an axially extending opening, designated by the numeral 78 in Figure 2, the ends of the housing having openings 79 and 80 providing access to the axially extending opening 78 from either end of the housing. The pinion shaft 33 with the drive pinion mounted thereon extends axially through the opening 78 and is mounted in the openings 79 and 80 respectively by bearing assemblies 81 and 82. The bearing assemblies 81 and 82 respectively include bearing housings 83 and 84 which are mounted in the openings 79 and 80 and bolted to the ends of the housing portion 4 to form the end closures 6 thereof mentioned in the description of Figure 1, the housing 84 having an opening through which the drive end of the shaft 33 extends. The housings 83 and 84 respectively mount outer races 85 and 86 which are tapered in opposite directions. Inner races 87 and 88 are mounted on the pinion shaft 33 concentrically with the outer races 85 and 86, roller bearings 89 being provided between each set of inner and outer races. The pinion shaft with gear 32 and inner races 87 and 88 thereon is mounted in position in the housing portion 4 by moving it axially to the position shown in Figure 3. Thereafter the bearing assemblies 81 and 82 are assembled on the shaft and completed by bolting the bearing housings 83 and 84 to the ends of the housing 4. The pinion shaft 33 has a drive part 90 which projects centrally through an opening in the bearing housing 84 for connection with a power-driven drive shaft.

As indicated above, the housing 1 which is continuous throughout its periphery and its axially extending openings 78 in the housing portion 4 and its aligned compartment openings 17, 18 and 19 in the main housing portion 3 provide for movement of all of the operating parts of the drive to a position for assembly from the ends of the housing. Starting with the housing as shown in Figure 2, assembly of the operating parts is readily accomplished by moving the hub 13 with drive gear 29 bolted thereon endwise through the enlarged openings 23 and 21 in the main housing portion 3 into the drive gear compartment 17 where it is elevated to a position for meshing engagement of the gear 29 with the pinion 32. The mounting ring 37 is then moved axially through the opening 22 at the other end of the housing and mounted in the opening 20 in the partition wall 15 after which the bearing assembly 34 is completed by mounting the inner race 39 on the hub 13 and applying the retaining rings 38 and 41. Upon completion of the bearing assembly 34, the hub is in condition for mounting of the bearing assembly 35 which is effected first by moving the ring 48 (shown in Figures 4 and 5) axially to the left as viewed in Figure 3 to a position mounted in the partition wall opening 21 and the housing opening 23. The outer race 47 of the bearing assembly 35 is then mounted in the opening 49. The bearing assembly 35 is completed by applying the retaining ring 46 to secure the inner race 44 to the hub 13, and this operation completes the mounting of the hub 13 and gear 29 in the gear drive compartment 17. The pinion shaft 33 with gear 32 thereon is then moved endwise into the compartment 78 to a position in meshing engagement with the gear 29 and its mounting is completed by securing the bearing housing caps 83 and 84 to the housing as described above. After the hub 13 is mounted in position, the drive pin 12 is mounted on the hub by moving it axially through the opening 22 and hub openings 62 and 61, and its mounting in the hub 13 is completed by threading the nut 65 on its threaded extension 64 to tighten its tapered end 60 in the tapered opening 62. The pitman is thereafter connected to the drive pin extension 67 as described above, and this operation is completed by bolting the holding plate 76 to the drive pin extension 67. The mounting of the second drive pin 14 in the hub 13 and connection of the second pitman are effected by operations and structure identical to those described in connection with the pin 12 but which are applied from the right of the housing as viewed in Figure 3. After connection of the pitmans with the drive pin 12 and 14 in this manner, the opening 22 into the housing compartment 18, and the opening 93 at the outer edge of the flange 54 (see Figures 3 and 4) are closed by the application of cover plates 5 (see Figures 1 and 3).

In the modified construction shown in Figure 6, the same numerals have been used to designate like parts. In this showing, a modified form of ring 96 is substituted in the opening 21 in place of the mounting ring 48. The ring 96 omits the outwardly projecting flange 54, reinforcing ribs 55, and outer ring 56 of the ring 48 in Figure 3. The ring 96 is secured in position by a retaining ring 97 which is bolted to the partition wall 16 and to the ring 96. The ring 96 has an inner periphery similar to the periphery 49 of the ring 48 for the reception of the bearing assembly 35 and an outer periphery similar to the outer periphery 50 of the ring 48 as shown in Figure 5 and which is received in the opening 21 in the partition wall 16. In place of the nut 64 for holding the pin 12 in position as shown in Figure 3, the pin 12 in Figure 6 is held in position by a plate 98 which bears against the hub end wall 27 and has cap screws 99 passing therethrough and engaged in the end of the pin 12 for drawing it to the right as viewed in Figure 6.

In the modification shown in Figure 7, the drive pin extension 67 is shown as comprising an integral part of the hub casting. This modification eliminates the assembly operations required for securing the pin 12 in position as shown in Figure 3.

From the foregoing, it will be apparent that all of the operating parts of the drive of this invention are assembled by movement through openings in the sides of the housing and that this feature of the invention eliminates the necessity of providing openings in the periphery of the casting which forms the housing. In this manner, the invention provides a housing construction which is stronger and more rigid than housings such as shown in the above mentioned patents which must be provided with peripheral openings for assembly of the drive gear.

Attention is also directed to the fact that the drive of this invention eliminates the crank shaft and crank arm of the prior art as shown in the above mentioned patents and reduces the overhang of the driving connection of the pitman with the drive gear. The elimination of the crank shaft and crank arm of the prior art in this manner results in the pitman connection afforded by the drive pin connection 67 of this invention being positioned much closer to the center of the drive gear 29 and closer to the bearing supports provided by the bearing assemblies 34 and 35 than heretofore possible. In this respect, it will be noted that the pitman connection afforded by the drive pin extension 67 of this invention rotates about a circular path which is positioned inside the bearing supports 34 and 35 whereas in the prior art, as shown in the above mentioned patents, the crank pin connection to the pitman is rotated in a circular path which has a larger diameter than the diameter of the bearing supports for the drive shaft and the drive gear. In this manner, torsional forces tending to set up vibration particularly when the apparatus is operating under heavy loads are reduced to a minimum.

The advantages with respect to assembly of operating parts, increased housing strength, and improved operational characteristics are obtained while at the same time providing a smaller and more compact drive. By eliminating the overhang of the crank-pin drive of conventional constructions, the axial length of the drive is reduced considerably and a corresponding reduction in weight is effected. The improvements provided in this respect will be better appreciated when consideration is given to the fact that a drive constructed in accordance with the principles of this invention and having a rated capacity of 925 H. P. had an axial length of 36" as compared to an axial length of 52" for a conventional drive of the type referred to above and having a rated capacity of only 600 H. P. The total weight of the improved drive including a pumping unit was 46,000 pounds as compared to 43,000 pounds for the conventional drive and pumping unit of lower capacity. This saving of weight is of considerable importance not only from the standpoint of cost of construction but also in shipping the apparatus to a site where it is to be used.

While one embodiment of our invention has been shown and described it will be apparent that other adaptations and modifications may be made without departing from the scope of the following claims.

We claim:

1. A pitman drive comprising a housing having a pair of axially spaced partition walls respectively provided with an opening centrally of said housing, a hub extending axially of said partition wall openings, a pair of bearing assemblies mounting said hub for rotation in said openings, a drive pin having an eccentric connection directly with said hub for rotation thereby along a circular path positioned inwardly of said bearing assemblies, a drive gear mounted on said hub substantially centrally of said bearing assemblies, and a pitman connected with and actuated by said drive pin.

2. A pitman drive comprising a housing having a pair of axially spaced partition walls respectively provided with a central opening, a hollow hub having end portions projecting through said partition wall openings, a pair of bearing assemblies mounting said hub end portions for rotation in said openings, a drive pin extending axially of said hub and having mounting connections with each of said end portions for rotation with said hub along a circular path positioned inwardly of said bearing assemblies, a drive gear mounted on said hub substantially centrally of said partition walls and bearing assemblies, and a pitman connected with said drive pin for actuation thereby.

3. A pitman drive comprising a housing having a pair of axially spaced partition walls respectively provided with an opening centrally of said housing, a hub extending axially of said partition wall openings, a pair of bearing assemblies mounting said hub for rotation in said openings, a drive gear mounted on said hub substantially centrally of said bearing assemblies, one of said partition walls comprising a first portion having an enlarged opening through which said hub with said drive gear thereon may be moved axially to a position between said partition walls, and a second portion removably fitted in said enlarged opening and in which the central opening of said one partition wall is formed, a drive pin having an eccentric connection directly with said hub for rotation thereby along a circular path positioned inwardly of said bearing assemblies, and a pitman connected with and actuated by said drive pin.

4. A pitman drive comprising a housing having a pair of axially spaced partition walls respectively provided with a central opening, a hollow hub having end portions projecting through said partition wall openings, a pair of bearing assemblies mounting said hub end portions for rotation in said openings, a drive gear mounted on said hub substantially centrally of said partition walls and bearing assemblies, one of said partition walls comprising a first portion having an enlarged opening through which said hub with said drive gear mounted thereon may be moved axially to a position between said partition walls, and a second portion removably fitted within said enlarged opening and in which the central opening in said one partition wall is formed, a drive pin extending axially of said hub and having mounting connections with each of said end portions for rotation with said hub along a circular path positioned inwardly of said bearing assemblies, and a pitman connected with said drive pin for actuation thereby.

5. A pitman drive comprising a housing having an opening extending axially between the ends thereof, a pair of axially spaced partition walls extending transversely of said housing opening and respectively having an opening in the center portion thereof, at least one of said partition walls being spaced axially inwardly of an end of said housing to provide a compartment between said one partition wall and said housing end, a hub extending axially of said partition wall openings, a pair of bearing assemblies mounting said hub for rotation in said partition wall openings, a drive gear mounted on said hub substantially centrally of said bearing assemblies, a drive pin having an eccentric connection directly with said hub for rotation thereby along a circular path positioned inwardly of said bearing assemblies, said pin having an end extending into said compartment, and a pitman in said compartment having an actuating connection with said drive pin end.

6. A pitman drive as claimed in claim 5 characterized by one of said partition walls comprising a first portion having an enlarged opening for assembly of said hub and gear mounted thereon by axial movement through said housing opening to an operative position between said partition walls, and a second portion removably fitted in said enlarged opening and having therein the said center portion wall opening of said last-named partition wall.

7. A pitman drive comprising a housing having an opening extending axially between the ends thereof, a pair of axially spaced partition walls extending transversely of said housing opening and respectively having an opening in the center portion thereof, at least one of said partition walls being spaced axially inwardly of an end of said housing to provide a compartment between said one partition wall and said housing end, a hollow hub having opposite end portions thereof respectively positioned within said partition wall openings, a pair of bearing assemblies mounting said end portions for rotation in said partition wall openings, a drive gear mounted on said hub centrally of its said end portions and said bearing assemblies, a drive pin extending axially of said hub and having mounting connections with each of said end portions for rotation with said hub along a circular path positioned inwardly of said bearing assemblies, said drive pin having an end thereof projecting into said compartment, and a pitman positioned within said compartment and having an actuating connection with said drive pin end portion.

8. A pitman drive comprising a housing having a pair of parallel openings extending between the ends thereof, one of said openings being relatively smaller than the other and constituting a pinion shaft opening, the other of said housing openings having a pair of partition walls extending transversely thereof and respectively provided with a central opening, at least one of said partition walls being spaced axially inwardly from an end of said housing and providing a compartment between said one partition wall and said housing end, a hub extending axially between said partition walls and having end portions positioned within said partition wall openings, a pair of bearing assemblies mounting said hub end portions for rotation in said partition wall openings, a drive gear mounted on said hub centrally of said partition walls and bearing assemblies, a drive pin having an eccentric connection directly with said hub for rotation thereby and having an operating part projecting into said compartment, a pitman positioned within said compartment and having an actuating connection with said drive pin operating part, said housing having an opening affording communication between its axially extending openings and through which a peripheral portion of said drive gear projects, a pinion shaft extending axially of said pinion shaft housing opening, bearing assemblies mounting the ends of said pinion shaft in said housing at the ends of said pinion shaft opening, and a pinion mounted on said pinion shaft centrally of said last-named bearing assemblies and having meshing engagement with said drive gear.

9. In a pitman drive, a housing having a pair of axially spaced partition walls respectively provided with an opening centrally of said housing, a hub extending axially of said partition wall openings, a drive gear mounted on said hub substantially centrally of said bearing assemblies, one of said partition walls comprising a first portion having an enlarged opening through which said hub with said drive gear thereon may be moved axially to a position between said partition walls, and a second portion removably fitted in said enlarged opening and in which the central opening of said one partition wall is formed, and a pair of bearing assemblies mounting opposite ends of said hub for rotation in said partition wall central openings.

10. In a pitman drive, a drive gear, a housing of integral construction having an opening extending axially between the ends thereof, a pair of axially spaced bearing supports extending transversely of said opening and defining a compartment therebetween for the reception of said drive gear, one of said bearing supports comprising a first portion having an enlarged opening through which said drive gear may be moved axially to a position in said compartment, and a second portion removably fitted in said enlarged opening, and means including a pair of bearing assemblies respectively mounted on the other of said bearing supports and on said second portion for rotatably supporting said gear in said housing.

11. In a pitman drive including a drive gear and a mounting hub therefor, a housing of integral construction having an opening extending axially between the ends thereof, a pair of axially spaced bearing supports extending transversely of said opening and defining a compartment therebetween for the reception of said drive gear, at least one of said bearing supports comprising a ring having means detachably mounting it in an operative position in said housing for removal therefrom and which when removed provides an enlarged opening through which said drive gear and its mounting hub may be moved axially into said compartment, and means including a pair of bearing assemblies rotatably supporting the ends of said hub in said bearing supports.

12. In a pitman drive, a housing having a pair of axially spaced partition walls respectively provided with a central opening, a hollow hub having end portions projecting through said partition wall openings, a pair of bearing assemblies mounting said hub end portions for rotation in said openings, a drive pin extending axially of said hub and supported in each of said end portions for rotation along a circular path positioned inwardly of said bearing assemblies, said drive pin having an end thereof projecting axially outwardly from one of said hub end portions, and a pitman connected with the said projecting end of said drive pin.

References Cited in the file of this patent

UNITED STATES PATENTS 2,133,048     Shimer _____ Oct. 11, 1938

FOREIGN PATENTS 514,580     Germany _____ Dec. 15, 1930